Aug. 20, 1957　　　E. B. FERNBERG　　　2,803,050
FASTENERS
Filed Jan. 26, 1954
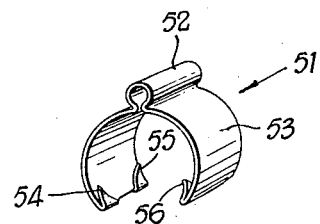
INVENTOR
Eric Birger Fernberg
By
ATTORNEY form # United States Patent Office 2,803,050
Patented Aug. 20, 1957

2,803,050
FASTENERS

Eric Birger Fernberg, Northwood, England, assignor to F. T. Products Limited, London, England, a British company Application January 26, 1954, Serial No. 406,242

1 Claim. (Cl. 24—259)

The present invention relates to an improved fastener.

It is known practice at the present time to use round-wire springs as one of the resilient components of the seat and back cushions of an automobile seat. The cushion has a frame of metal tube or rod to which the springs are attached at their ends and it is an object of this invention to provide an improved clip for this purpose.

The invention will now be described with reference to the accompanying drawing, in which the sole figure is a perspective view of a clip embodying the improvements.

Clip 51 is formed from a rectangular strip of spring material. Before the metal is rendered resilient, and when in the blank, the two ends are cut away to leave triangular portions the apices of which point away from the strip in its longitudinal direction. During the fabrication of the clip a small loop 52 is formed about half way along its length, the main portion of the body 53 is bowed to C-shape and the four triangular portions are folded back upon themselves to form four prongs, such as those shown at 54, 55 and 56, each prong being inwardly and rearwardly directed with respect to the concave side of the clip.

Clip 51 may be used to secure any rod or tube-like member to a substantially cylindrical object, such as another rod or tube, it being understood that the outer surface of the cylindrical object is such that prongs 54, 55 and 56 may bite into it and thus militate against the clip twisting on the object. The bow of body 53 should be along a diameter approximately equal to that of the cylindrical object and of arcuate length sufficient to engage the object over a major arc of its cross-section.

What I claim is:

A fastener for securing a rod to a substantially cylindrical object, comprising a unitary clip of spring sheet metal, said clip being substantially C-shaped and more than 180° extent and along the arc of a diameter approximately equal to that of said object and engaging said object over a major arc of its cross-section, a pair of prongs adjacent each end portion of the clip, the prongs of each pair inclining inwardly and rearwardly, at least one of said prongs being at the extreme end of the clip and being folded at its root back upon itself, thereby to enhance the strength of the prong, and a loop formed in the clip transversely thereof and of a diameter approximately equal to that of the rod, said loop being substantially intermediate the ends of the clip, said clip being arranged to be snapped transversely over said object so that the prongs pass over a diameter of said object and bite into the same and militate against the clip twisting on said object.

References Cited in the file of this patent

UNITED STATES PATENTS

| 265,688 | Marsh | Oct. 10, 1882 |
| 564,573 | Hartshorn | July 21, 1896 |
| 754,884 | McFarlane | Mar. 15, 1904 |
| 967,628 | Franklin | Aug. 16, 1910 |
| 1,653,465 | Montan | Dec. 20, 1927 |
| 2,314,923 | Clark | Mar. 30, 1943 |
| 2,591,185 | Neely | Apr. 1, 1952 |